US012591476B2

(12) United States Patent
Kim

(10) Patent No.: US 12,591,476 B2
(45) Date of Patent: Mar. 31, 2026

(54) EMPTY PAGE DETECTION

(71) Applicant: Micron Technology, Inc., Boise, ID (US)

(72) Inventor: Kyungjin Kim, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/400,027

(22) Filed: Dec. 29, 2023

(65) Prior Publication Data

US 2024/0220345 A1    Jul. 4, 2024

Related U.S. Application Data

(60) Provisional application No. 63/436,724, filed on Jan. 3, 2023.

(51) Int. Cl.
*G06F 11/00* (2006.01)
*G06F 11/07* (2006.01)

(52) U.S. Cl.
CPC .......... *G06F 11/076* (2013.01); *G06F 11/073* (2013.01)

(58) Field of Classification Search
CPC .. G06F 11/076; G06F 11/073; G06F 11/0727; G06F 11/0736
See application file for complete search history.

(56) References Cited

U.S. PATENT DOCUMENTS

| | | | |
|---|---|---|---|
| 2010/0106897 A1* | 4/2010 | Yoshimura | G11C 16/10 |
| | | | 711/E12.008 |
| 2024/0061600 A1* | 2/2024 | Zhang | G11C 29/021 |

* cited by examiner

*Primary Examiner* — Katherine Lin
(74) *Attorney, Agent, or Firm* — Schwegman Lundberg & Woessner, P.A.

(57) ABSTRACT

Aspects of the present disclosure configure a system component, such as a memory sub-system controller, to detect erroneous empty pages. The controller detects a read error associated with reading data from a set of memory components in accordance with an individual read level of a plurality of read levels. In response to detecting the read error, the controller computes one or more check failure unit count values corresponding to the individual read level. The controller compares the one or more check failure unit count values to a threshold value and determines whether the read error corresponds to an empty page read error based on a result of comparing the one or more check failure unit count values to the threshold value.

20 Claims, 7 Drawing Sheets

500

505 DETECT A READ ERROR ASSOCIATED WITH READING DATA FROM A SET OF MEMORY COMPONENTS IN ACCORDANCE WITH AN INDIVIDUAL READ LEVEL OF A PLURALITY OF READ LEVELS

RESPONSIVE TO THE READ ERROR

510 COMPUTE ONE OR MORE CHECK FAILURE UNIT COUNT VALUES CORRESPONDING TO THE INDIVIDUAL READ LEVEL

515 COMPARE THE ONE OR MORE CHECK FAILURE UNIT COUNT VALUES TO A THRESHOLD VALUE

520 DETERMINE WHETHER THE READ ERROR CORRESPONDS TO AN EMPTY PAGE READ ERROR BASED ON A RESULT OF COMPARING THE ONE OR MORE CHECK FAILURE UNIT COUNT VALUES TO THE THRESHOLD VALUE

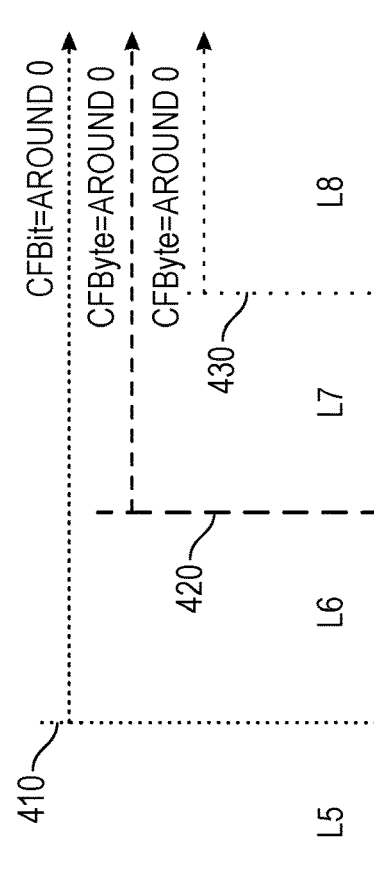
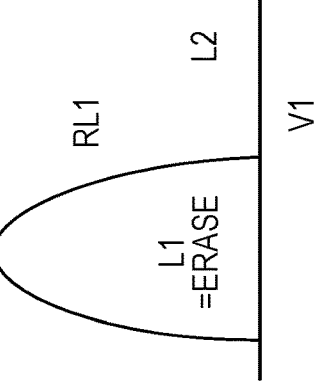
*FIG. 4*

500

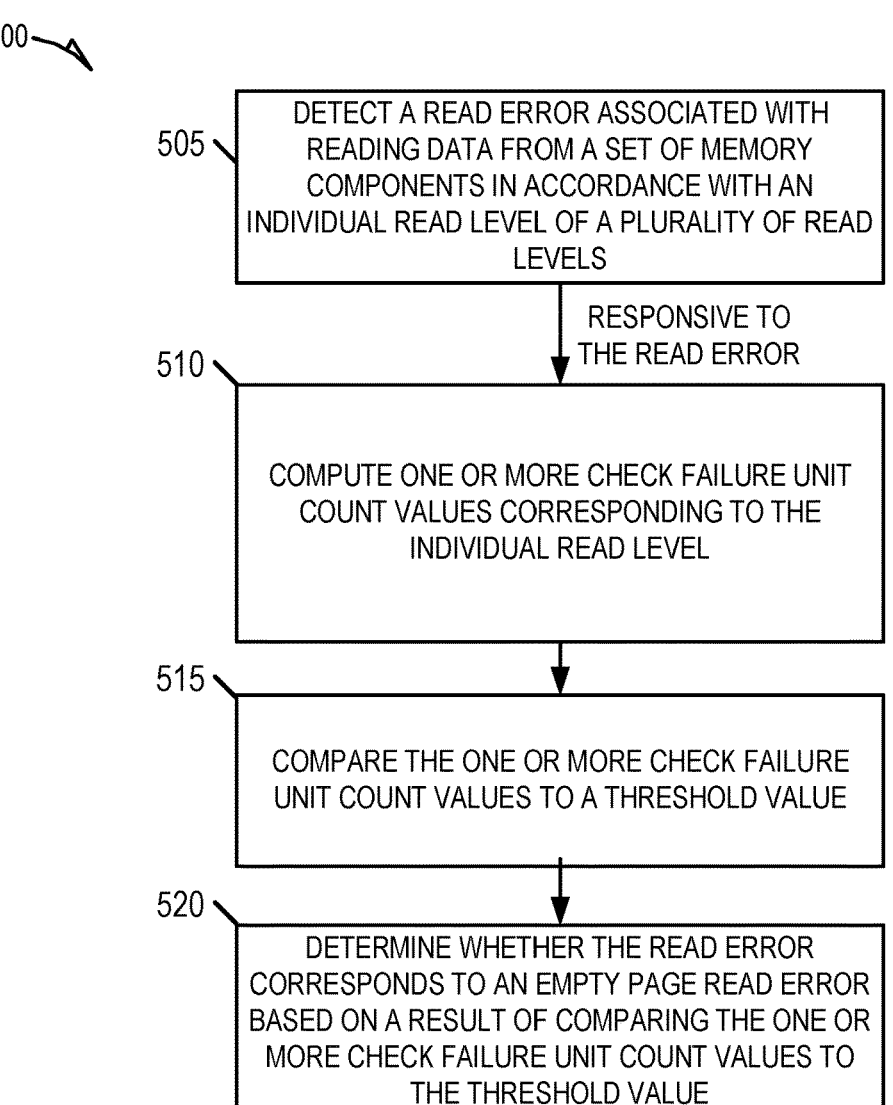

505 — DETECT A READ ERROR ASSOCIATED WITH READING DATA FROM A SET OF MEMORY COMPONENTS IN ACCORDANCE WITH AN INDIVIDUAL READ LEVEL OF A PLURALITY OF READ LEVELS

RESPONSIVE TO THE READ ERROR

510 — COMPUTE ONE OR MORE CHECK FAILURE UNIT COUNT VALUES CORRESPONDING TO THE INDIVIDUAL READ LEVEL

515 — COMPARE THE ONE OR MORE CHECK FAILURE UNIT COUNT VALUES TO A THRESHOLD VALUE

520 — DETERMINE WHETHER THE READ ERROR CORRESPONDS TO AN EMPTY PAGE READ ERROR BASED ON A RESULT OF COMPARING THE ONE OR MORE CHECK FAILURE UNIT COUNT VALUES TO THE THRESHOLD VALUE

*FIG. 5*

EMPTY PAGE DETECTION

PRIORITY APPLICATION

This application claims the benefit of priority to U.S. Provisional Application Ser. No. 63/436,724, filed Jan. 3, 2023, which is incorporated herein by reference in its entirety.

TECHNICAL FIELD

Embodiments of the disclosure relate generally to memory sub-systems and more specifically to detecting empty pages or erroneously empty pages in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 4 presents an example empty page detected based on one or more read levels and their respective check failure unit count values, in accordance with some implementations of the present disclosure.

FIGS. 5 and 6 are flow diagrams of example methods to perform read error correction, in accordance with some implementations of the present disclosure.

DETAILED DESCRIPTION

Figure 1:
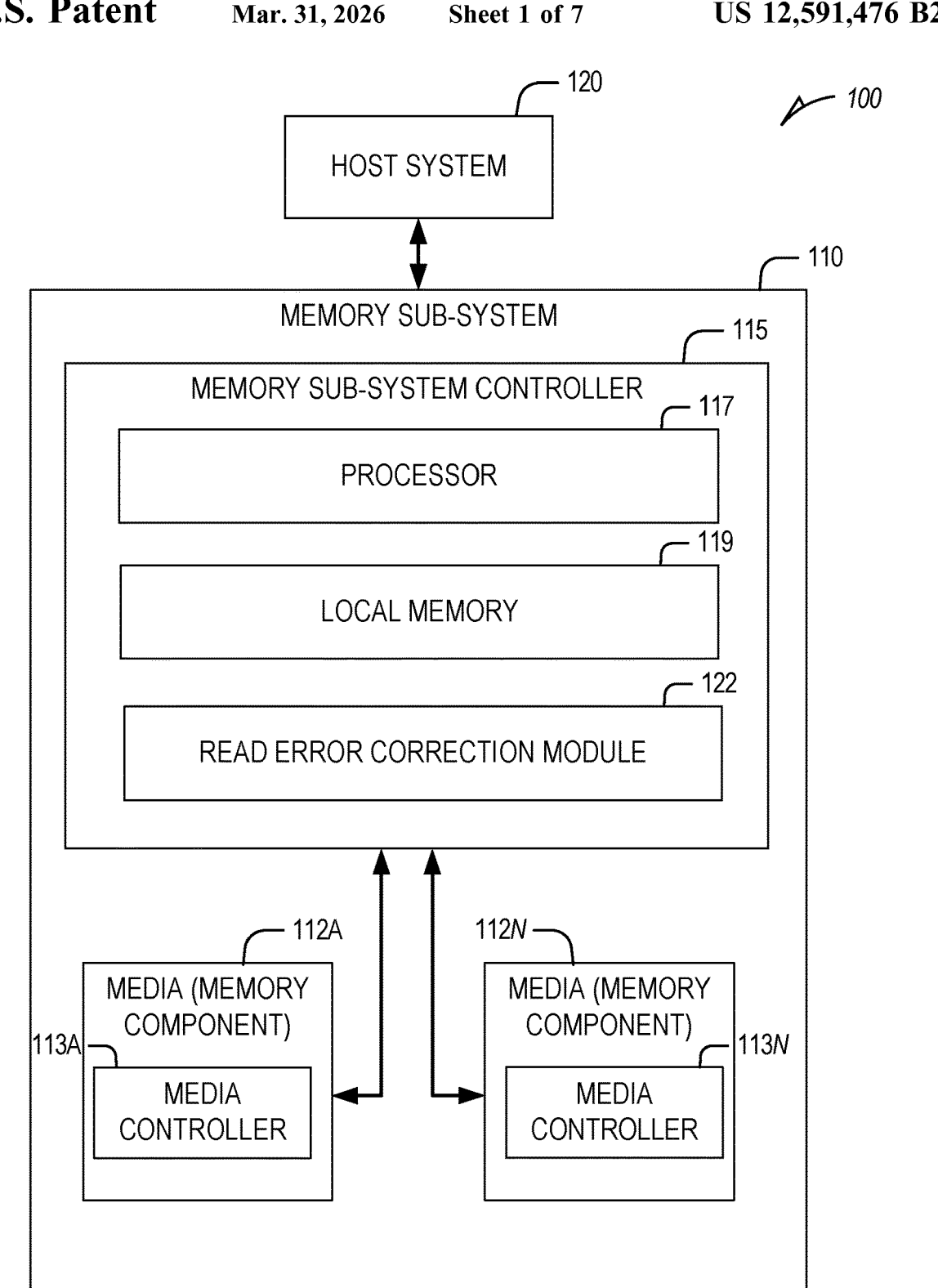
FIG. 1 is a block diagram illustrating an example computing environment including a memory sub-system, in accordance with some embodiments of the present disclosure.

Aspects of the present disclosure configure a system component, such as a memory sub-system controller, to correct a read error in data read from one or more memory components based on whether check failure unit count values of one or more individual read levels used to store the data transgress a threshold. Data can be read from memory components using different read bias levels or read levels.

The disclosed controller can detect a page error, such as an empty page, in the data read at an individual read level and can correct the read level based on a set of conditions. Specifically, the controller can detect a read error associated with reading data from a set of memory components in accordance with an individual read level of a plurality of read levels. In response to detecting the read error, the controller computes one or more check failure unit count values (e.g., CFBit count values and/or CFByte count values) corresponding to the individual read level.

The controller compares the one or more check failure unit count values to a threshold value (or multiple threshold values) and determines whether the read error corresponds to an empty page read error based on a result of comparing the one or more check failure unit count values to the threshold value. In some cases, the controller can also track the quantity of set bits in a portion (e.g., a page) of a block of data read from the memory components. If the quantity of set bits transgresses (e.g., is greater than) a threshold, the controller flags that portion as an empty page. In some examples, one or more error correction operations, such as a RAID operation, can be perform to store, repair, and/or replace the data in the page that has been detected to be empty.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data."

The memory sub-system can initiate media management operations, such as a write operation, on host data that is stored on a memory device. For example, firmware of the memory sub-system may rewrite previously written host data from a location on a memory device to a new location as part of garbage collection management operations. The data that is rewritten, for example as initiated by the firmware, is hereinafter referred to as "garbage collection data."

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

A memory device can be a non-volatile memory device. A non-volatile memory device is a package of one or more dice. Each die can comprise one or more planes. Each logical block address (LBA) of the memory device comprises a set of pages. Each page comprises a set of memory cells, which store bits of data. The memory devices can be raw memory devices (e.g., negative-and (NAND)), which are managed externally, for example, by an external controller. The memory devices can be managed memory devices (e.g., managed NAND), which is a raw memory device combined with a local embedded controller for memory management within the same memory device package.

Conventional memory sub-systems can employ error-correction techniques that involve a decoding process. Such decoding processes can include application of a Low Density Parity Check (LDPC) error code check (ECC) engine to data read from the memory device. The parameters of the LDPC ECC engine can be adjusted to perform more or less complex decoding operations, such as those that utilize hard bit decoding and/or those that utilize soft-bit decoding operations. By performing such error-correction techniques, if a data member of the collection is lost (e.g., corrupted) for any reason, the LDPC ECC engine can be applied to recreate the lost data.

In some cases, data can still not be completely recovered even after performing various error correction processes. For example, data can be stored and represented in the memory sub-system at different read levels. Specifically, in a tri-level cell (TLC) memory device, data can be stored in one of eight different read levels of the memory sub-system. Charges stored at the different read levels can be read and interpreted into a set of three bits. Ideally, the data is read by applying a read level within a CoV, which defines a range of voltage levels that can be applied to accurately read the data from an individual one of the eight different read levels.

In certain situations, the charges stored at one of the read levels can be lost or shift around, which results in inaccuracies when read at the predetermined read level or even within a previously computed CoV. In these circumstances, the page read from the memory can be erroneously decoded as an empty page. Namely, the host can issue a request to read data from a given LBA and the memory subsystem can return an empty page as the data read from the physical address corresponding to the LBA. The empty page is erroneously empty because data was expected to be stored at the physical address yet an empty page was returned in the data read operation. Sometimes the pages are returned as empty for various reasons including abnormal firmware or controller behavior, corrupt page tables, abnormal memory component behavior, and/or write protection associated with the read data.

In the process of receiving the erroneously empty page, the conventional system can perform additional error correction operations to correct the read error. Particularly, the conventional systems can attempt to read the data multiple times to determine whether the page is returned empty again. After multiple read attempts are performed on the same LBA and corresponding physical address and the page is erroneously empty multiple times, the conventional systems employ a RAID approach to correct the data in the page. While this approach generally works well, the need to reread the data multiple times to ensure that the page is erroneously empty is incredible inefficient and adds severe lag to performing memory operations.

Aspects of the present disclosure address the above and other deficiencies by configuring a system component, such as a memory sub-system controller of a memory sub-system, to detect whether a page read from memory is erroneously empty without having to perform multiple read operations. Specifically, the controller uses check failure unit count values (e.g., CFBit count values and/or CFByte count values) of one or more read levels associated in response to detecting a read error in reading data from a physical address corresponding to a host issued LBA address. The controller, in response to detecting the read error, computes one or more check failure unit count values (e.g., CFBit count values and/or CFByte count values) corresponding to the individual read level and compares the one or more check failure unit count values to a threshold value (or multiple threshold values). The controller then determines whether the read error corresponds to an empty page read error based on a result of comparing the one or more check failure unit count values to the threshold value. For example, if the check failure unit count values are less than the threshold, the controller can mark the page as an erroneously empty page without having to reread the data multiple times. At this point, the controller can automatically trigger other error correction operations, such as RAID operations to correct the data stored in the physical address.

In some cases, the controller can also track the quantity of set bits in a portion (e.g., a page) of a block of data read from the memory components. If the quantity of set bits transgresses (e.g., is greater than) a threshold, the controller flags that portion as an empty page. In some examples, one or more error correction operations, such as a RAID operation, can be performed to store, repair, and/or replace the data in the page that has been detected to be empty.

In some examples, the controller accesses a predetermined check failure unit count value associated with the individual read level of the plurality of read levels. The controller computes the threshold value as a function of the predetermined check failure unit count value. In some examples, the controller reads the data from the set of memory components by accessing first and second read levels of the plurality of read levels. The controller accesses a first predetermined check failure unit count value associated with the first read level and computes a first threshold value as a function of the first predetermined check failure unit count value.

In some examples, the controller accesses a second predetermined check failure unit count value associated with the second read level and computes a second threshold value as a function of the second predetermined check failure unit count value. In some examples, the controller computes a first check failure unit count value of the one or more check failure unit count values corresponding to the first read level and computes a second check failure unit count value of the one or more check failure unit count values corresponding to the second read level. The controller compares the first check failure unit count value to the first threshold value and compares the second check failure unit count value to the second threshold value. The empty page read error is detected in response to determining that the first check failure unit count value is less than the first threshold value and that the second check failure unit count value is less than the second threshold value.

In some examples, the one or more check failure unit count values include one or more CFBit count values and one or more CFByte count values and the threshold is a first threshold. In such cases, the controller compares the one or more CFBit count values to the first threshold and compares the one or more CFByte count values to a second threshold. The controller determines that at least one of the one or more CFBit count values is less than the first threshold or that the one or more CFByte count values are less than the second threshold. The controller triggers a RAID operation to recover the data from the set of memory components in response to determining that at least one of the one or more CFBit count values is less than the first threshold or that the one or more CFByte count values are less than the second threshold.

In some examples, the controller performs a calibration operation to compute an initial set of one or more check failure unit count values for the individual read level. The controller computes the one or more check failure unit count values corresponding to the individual read level after determining that the initial set of one or more check failure unit count values is less than the threshold.

In some examples, the controller receives a request from a host to read a page of data. The read error is detected in response to receiving the request from the host. In some examples, the controller receives a block of data from the set of memory components. The controller computes a quantity of asserted values in a portion of the block of data and determines that the quantity of asserted values in the portion of the block of data transgresses an erased page threshold. In such cases, the controller flags the portion of the block of data as an empty page. In some examples, the controller performs a RAID operation to recover the data from the set of memory components in response to determining that the portion of the block of data is flagged as an empty page.

Though various embodiments are described herein as being implemented with respect to a memory sub-system (e.g., a controller of the memory sub-system, a memory component, a media controller, or combination thereof), some or all of the portions of an embodiment can be implemented with respect to a host system, such as a software application, an operating system of the host system, or only by the media controller rather than or in addition to the memory sub-system controller.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or quad level cells (QLCs)). In some embodiments, a particular memory component 112 can include both an SLC portion and an MLC portion of memory cells. Each of the memory cells can store one or more bits of data (e.g., pages and/or blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or LBAs that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

A memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a read error correction module 122 that performs or facilitates correcting read data errors, such as by detecting an empty page or erroneously empty page based on a single read operation and triggering a RAID operation in response, in accordance with some embodiments described herein. In some embodiments, the controller 115 includes at least a portion of the read error correction module 122. For example, the controller 115 can include a processor 117 (processing device) configured to execute instructions stored in local memory 119 for performing the operations described herein. In some embodiments, the read error correction module 122 is part of the host system 120, such as a software application or an operating system on the host system 120. In some embodiments, the read error correction module 122 is part of the media controller 113A and/or media controller 113N.

According to some embodiments, the read error correction module 122 detects a read error associated with reading data from the set of memory components in accordance with an individual read level of a plurality of read levels. In response to detecting the read error, the read error correction module 122 computes one or more check failure unit count values corresponding to the individual read level. The controller compares the one or more check failure unit count values to a threshold value and determines whether the read error corresponds to an empty page read error based on a result of comparing the one or more check failure unit count values to the threshold value.

The check failure unit count values, as referred to herein, represent a count of a total quantity of bits (in case of CFBit count value) and/or total quantity of bytes (in case of CFByte count value) that are programmed (e.g., have a '0' logic level) or represented by one or more individual read levels of the memory components 112A-N. The CFBit count value and CFByte count value can be cumulative such that read levels associated with higher read voltages have a higher CFBit/CFByte count values than read levels associated with lower read voltages.

In some examples, the memory components 112 can generate and assign a total predetermined CFBit/CFByte count value and divide that total predetermined CFBit/CFByte count value by the total number of read levels that can be used to stored data in the memory components 112A-N. For example, the read error correction module 122 can store a first predetermined CFBit/CFByte count value representing a first total quantity of bits/bytes that can be programmed at a first read level (e.g., L1) of a plurality of read levels and can store a second predetermined CFBit/CFByte count value representing a second total quantity of bits/bytes that can be programmed at a second read level (e.g., L2) of a plurality of read levels. The first total quantity can correspond to the total predetermined CFBit/CFByte count value and the second total quantity can correspond to the total predetermined CFBit/CFByte count value minus the value computed by dividing that total predetermined CFBit/CFByte count value by the total number of read levels. This process can continue until each read level is associated with the predetermined total quantity of bits/bytes to generate and associate the CFBit/CFByte count value with each read level.

The read error correction module 122 can generate a first threshold associated with a CFBit count value that is used to determine whether a set of bits read from an individual read level represents an empty page. In some examples, the first threshold is computed as a function of the predetermined CFBit count value associated with the individual read level. For example, the first threshold can correspond to 10, 20, or 30 percent of the corresponding predetermined CFBit count value associated with the individual read level. The read error correction module 122 can generate a second threshold associated with a CFByte count value that is used to determine whether a set of bytes read from the individual read level represents an empty page. In some examples, the second threshold is computed as a function of the predetermined CFByte count value associated with the individual read level. For example, the second threshold can correspond to 1%-5% of the corresponding predetermined CFByte count value associated with the individual read level.

The read error correction module 122 can determine that a host read operation associated with reading data from an individual read level resulted in read errors. In such cases, the read error correction module 122 can compute a CFBit count value by reading a quantity of '1's (or alternatively '0's) stored or programmed at the individual read level and/or one or more other read levels. In addition or alternatively, the read error correction module 122 can compute a CFByte count value by reading a quantity of bytes having all '1's (or alternatively all '0's) stored or programmed at the individual read level and/or one or more other read levels. These CFBit/CFByte count values can be used to determine whether a page being read from the corresponding bit lines of the memory components 112A-N is an empty page. For example, the read error correction module 122 can retrieve the first or second threshold and compare the computed CFBit count value to the first threshold and/or can compare the computed CFByte count value to the second threshold. If either the CFBit count value is less than the first threshold or the CFByte count value is less than the second threshold, the read error correction module 122 determines that the read data corresponds to an empty page or erroneously empty page. In this way, the read error correction module 122 can determine that a page of data is empty or erroneously empty without performing multiple read operations prior to triggering a RAID operation to correct the page.

In some examples, the read error correction module 122 receives a block of data from the set of memory components 112A-N. The read error correction module 122 computes a quantity of asserted values in a portion of the block of data or quantity of '1's or '0's in a portion of the block of data, such as in a page or 4 kilobyte portion. The read error correction module 122 determines that the quantity of asserted values in the portion of the block of data transgresses an erased page threshold and flags the portion of the block of data as an empty page. In such cases, the memory sub-system controller 115 can perform a RAID operation to recover the data from the set of memory components in response to determining that the portion of the block of data is flagged as an empty page.

Depending on the embodiment, the read error correction module 122 can comprise logic (e.g., a set of transitory or non-transitory machine instructions, such as firmware) or one or more components that causes the memory sub-system 110 (e.g., the memory sub-system controller 115) to perform operations described herein with respect to the read error correction module 122. The read error correction module 122 can comprise a tangible or non-tangible unit capable of performing operations described herein. Further details with regards to the operations of the read error correction module 122 are described below.

Figure 2:
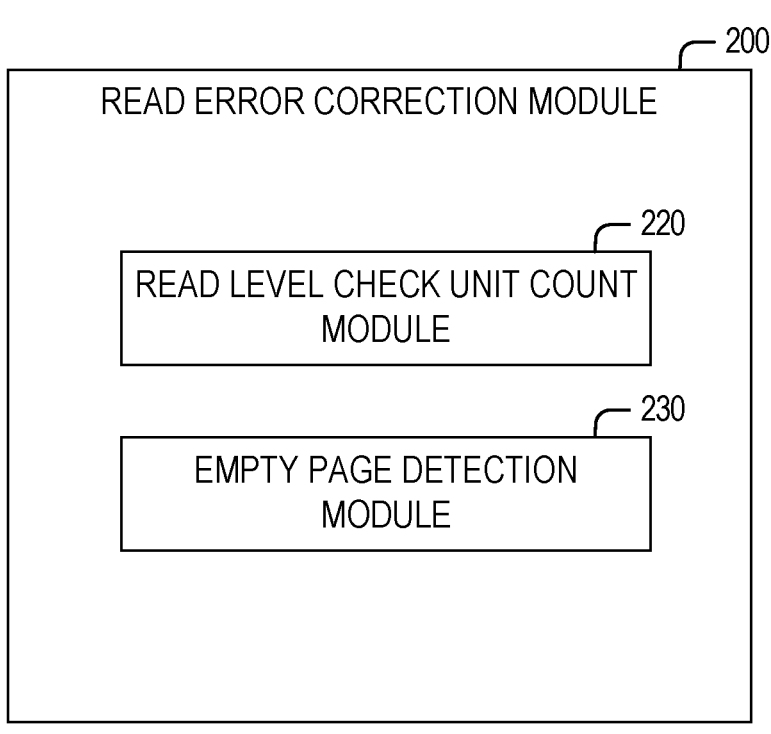
FIG. 2 is a block diagram of an example read error correction module, in accordance with some implementations of the present disclosure.

FIG. 2 is a block diagram of an example read error correction module 200, in accordance with some implementations of the present disclosure. As illustrated, the read error correction module 200 includes a read level check unit count module 220 and an empty page detection module 230. For some embodiments, the read error correction module 200 can differ in components or arrangement (e.g., less or more components) from what is illustrated in FIG. 2. The read error correction module 200 can be implemented by the memory sub-system controller 115 and/or by one or more of the media controllers 113A-N.

The read error correction module 200 can be used in case of encountering a read error associated with reading data from the memory components 112 according to an individual read level of a plurality of read levels. In such cases, the read level check unit count module 220 computes one or more check failure unit count values (e.g., CFBit and/or CFByte count values) corresponding to the individual read level.

Figure 3:
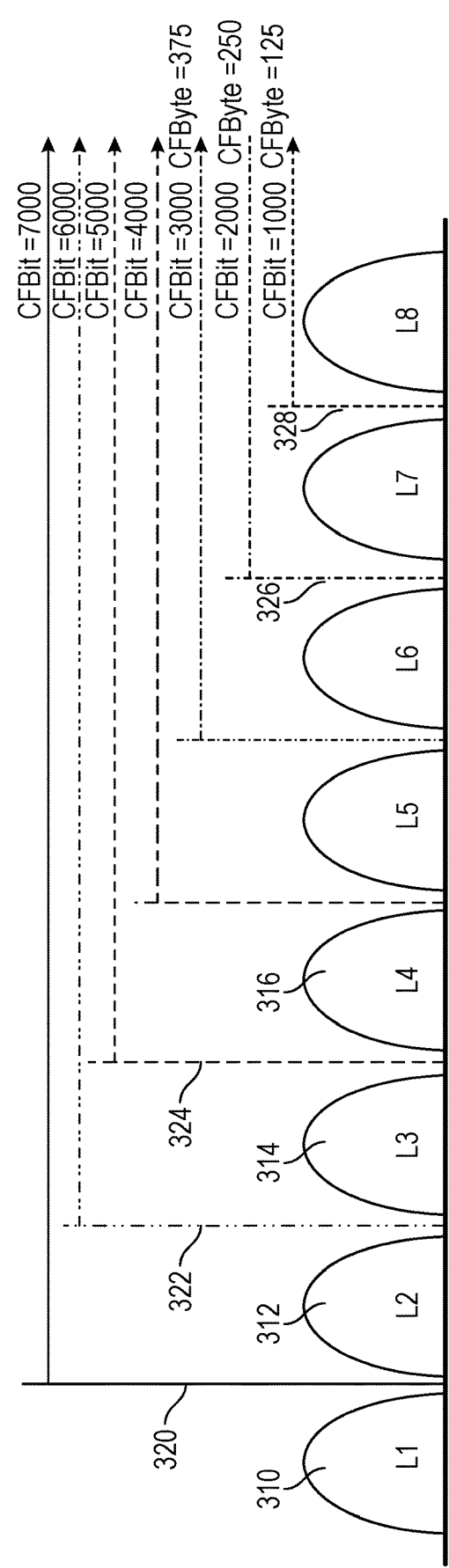
FIG. 3 presents a list of different read levels and check failure bit (CFBit) count values and check failure byte (CFByte) count values of the associated center of valleys (CoVs), in accordance with some implementations of the present disclosure.

For example, as in the distribution of CFBits/CFBytes 300 shown in FIG. 3, the memory components 112 can store data in one of eight different levels (L1-L8). Each of the different levels can be read by applying a different read threshold voltage (read level). For example, data stored in a first level 310 can be read by applying a first range of read levels, data stored in a second level 312 can be read by applying a second range of read levels, data stored in a third level 314 can be read by applying a fourth range of read levels, and data stored in a fourth level 316 can be read by applying a fifth range of read levels. Ideally, the read level that is applied to optimally and most effectively read data from a particular level is defined by a CoV, such as a first CoV 320, a second CoV 322, a third CoV 324, a fourth CoV 326, and a fifth CoV 328.

In order to enable the read error correction module 200 to detect an empty page for each read level (which defines an appropriate range of read levels for accurately reading data from a given level), the memory components 112 store or generate ideal or predetermined CFBit/CFByte count values for each level. For example, the first CoV 320 can be associated with a first CFBit count (e.g., 7000), the second CoV 322 can be associated with a second CFBit count (e.g., 6000), and the third CoV 324 can be associated with a third CFBit count (e.g., 5000). The fourth CoV 326 can correspond to a CFBit count of 2000 and a CFByte count of 250 and the fifth CoV 328 can correspond to a CFBit count of 1000 and a CFByte count of 125. These are all illustrative and example quantities and the CFBit and CFByte values can be computed and set to different quantities than these disclosed quantities. It can be seen that the CFBit counts differ by a predetermined quantity between each corresponding CoV that is read. Using this information, the read level check unit count module 220 can determine and identify whether a block of data corresponds to an empty page.

For example, as shown in FIG. 4, the read error correction module 200 can determine that a read error has occurred during reading of data from one or more read levels of the memory components 112A-N. The read error correction module 200 can, in response, compute a first CFBit count value 410 corresponding a first level of the multiple levels 400 shown that are used to store data in the memory components 112A-N. The read error correction module 200 can compare the first CFBit count value 410 to a first threshold and can determine that the first CFBit count value 410 is less than the first threshold. In some cases, the read error correction module 200 performs a calibration operation by reading or computing an initial CFBit/CFByte count value 410 and determining that the initial CFBit/CFByte count value is less than the first or a second threshold. After the calibration operation is completed and in response to determining that the initial CFBit/CFByte count value 410 is less than the first or a second threshold, the read error correction module 200 computes the first CFBit count value 410 to determine if the first CFBit count value 410 is less than the first threshold.

In some examples, if the first CFBit count value 410 is greater or less than the first threshold, the read error correction module 200 can compute a first CFByte count value 420 corresponding a second level of the multiple levels 400 shown that are used to store data in the memory components 112A-N. The read error correction module 200 can compare the first CFByte count value 420 to a second threshold and can determine that the first CFByte count value 420 is less than the second threshold. In some cases, the first CFByte count value 420 is computed and compared to the second threshold after the initial CFByte count value is computed and is determined to be below the second threshold. In some cases, the second threshold can be smaller than the first threshold. In some cases, the first and second thresholds are the same. In some cases, the second threshold can be larger than the first threshold.

The read error correction module 200 can also compute a second CFByte count value 430 corresponding to a third level of the multiple levels 400 shown that are used to store data in the memory components 112A-N. The read error correction module 200 can compare the second CFByte count value 430 to the second threshold (or a third threshold generated based on the predetermined CFByte count value of the third level). The read error correction module 200 can determine that the second CFByte count value 430 is less than the second threshold (or third threshold).

The read error correction module 200 can determine that the data error resulting from reading the data from the memory components 112A-N corresponds to an empty page or erased page and/or erroneously empty page. For example, the read error correction module 200 can make this determination in response to determining that all of or any given one of the following conditions are met: the first CFBit count value 410 is less than the first threshold; the first CFByte count value 420 is less than the second threshold; and/or the second CFByte count value 430 is less than the second threshold (or third threshold). In such cases, the read error correction module 200 triggers a RAID operation to correct the data stored in the memory components 112A-N.

FIG. 5 is a flow diagram of an example method 500 to perform read error correction, in accordance with some implementations of the present disclosure. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the memory sub-system controller 115 of FIG. 1. In these embodiments, the method 500 can be performed, at least in part, by the read error correction module 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 5, the method (or process) 500 begins at operation 505, with a processing device of a memory sub-system (e.g., of processor of the memory sub-system controller 115) detecting a read error associated with reading data from a set of memory components in accordance with an individual read level of a plurality of read levels.

At operation 510, the processing device of the memory sub-system, in response to detecting the read error at operation 505, computes one or more check failure unit count values corresponding to the individual read level. Then, the processing device of the memory sub-system, at operation 515, compares the one or more check failure unit count values to a threshold value and, at operation 520, determines whether the read error corresponds to an empty page read error based on a result of comparing the one or more check failure unit count values to the threshold value.

Figure 6:
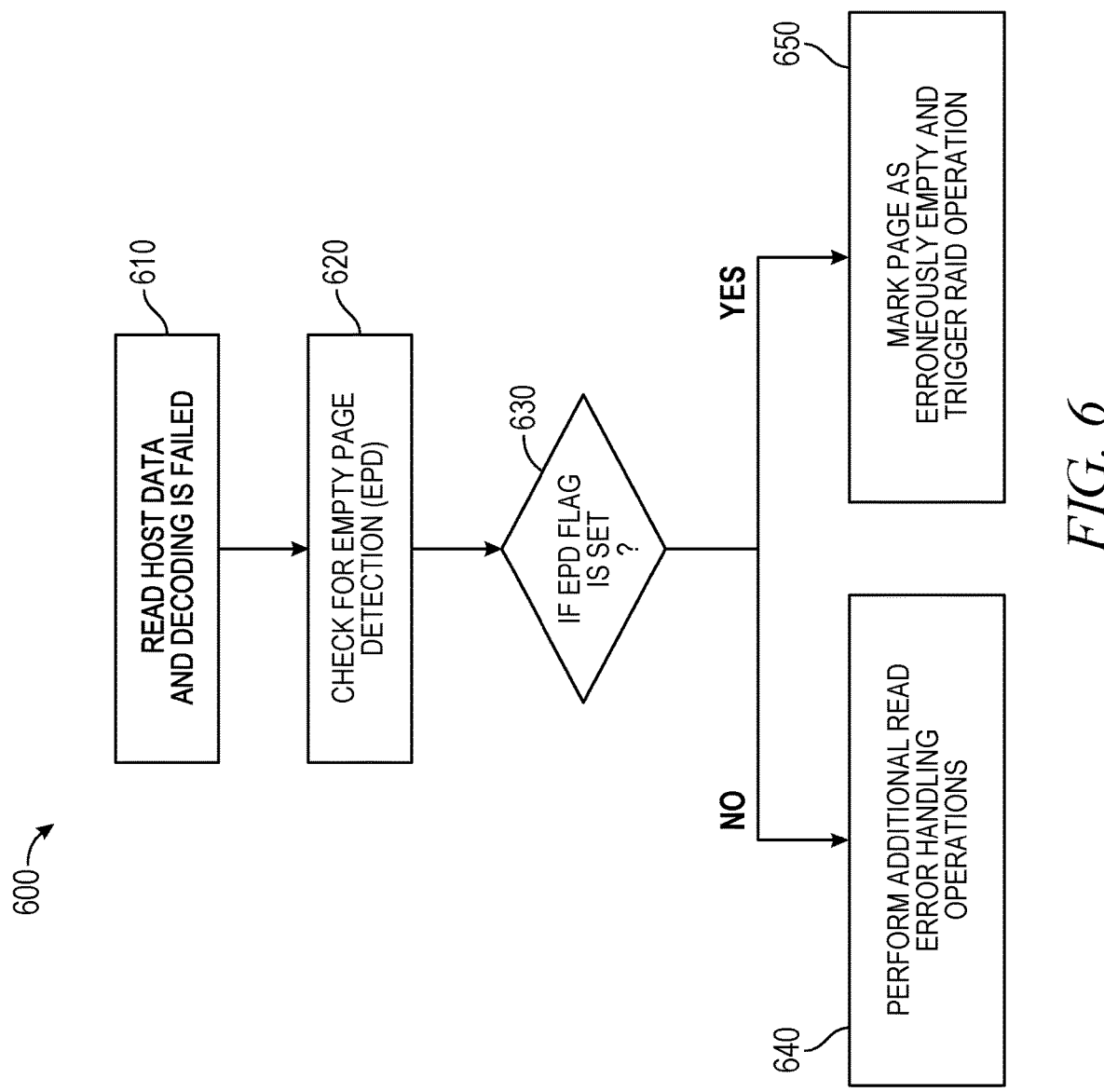

FIG. 6 is a flow diagram of an example method 600 to perform read error correction, in accordance with some implementations of the present disclosure. Method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the memory sub-system controller 115 of FIG. 1. In these embodiments, the method 600 can be performed, at least in part, by the read error correction module 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 6, the method (or process) 600 begins at operation 610, with a processing device of a memory sub-system (e.g., of processor of the memory sub-system controller 115) reading host data and determining that decoding of the host data has failed. In such cases, at operation 620, the memory sub-system controller 115 checks for the need to generate an empty page flag, such as by determining if a quantity of read '0's or '1's in a portion of a block of data exceeds or transgresses a threshold quantity. If so, the empty page flag is set. In such cases, the memory sub-system controller 115, at operation 630, determines that the empty page flag for a portion of the data has been set and, at operation 650, marks the page as erroneously empty and triggers a RAID operation to correct the data. If the empty page flag is not set, the memory sub-system controller 115 performs operation 640 where additional read error handling operations are performed to correct the data in the portion of the block of data read from the memory components 112A-N.

In view of the disclosure above, various examples are set forth below. It should be noted that one or more features of an example, taken in isolation or combination, should be considered within the disclosure of this application.

Example 1. A system comprising: a set of memory components; and a processing device, operatively coupled to the set of memory components, configured to perform operations comprising: detecting a read error associated with reading data from the set of memory components in accordance with an individual read level of a plurality of read levels; and in response to detecting the read error: computing one or more check failure unit count values corresponding to the individual read level; comparing the one or more check failure unit count values to a threshold value; and determining whether the read error corresponds to an empty page read error based on a result of comparing the one or more check failure unit count values to the threshold value.

Example 2. The system of Example 1, wherein the one or more check failure unit count values comprise one or more CFBit count values.

Example 3. The system of any one of Examples 1-2, wherein the one or more check failure unit count values comprise one or more CFByte count values.

Example 4. The system of any one of Examples 1-3, the operations comprising: accessing a predetermined check failure unit count value associated with the individual read level of the plurality of read levels; and computing the threshold value as a function of the predetermined check failure unit count value.

Example 5. The system of any one of Examples 1-4, the operations comprising: reading the data from the set of memory components by accessing first and second read levels of the plurality of read levels; accessing a first predetermined check failure unit count value associated with the first read level; and computing a first threshold value as a function of the first predetermined check failure unit count value.

Example 6. The system of Example 5, the operations comprising: accessing a second predetermined check failure unit count value associated with the second read level; and computing a second threshold value as a function of the second predetermined check failure unit count value.

Example 7. The system of Example 6, the operations comprising: computing a first check failure unit count value of the one or more check failure unit count values corresponding to the first read level; computing a second check failure unit count value of the one or more check failure unit count values corresponding to the second read level; and comparing the first check failure unit count value to the first threshold value and comparing the second check failure unit count value to the second threshold value, wherein the empty page read error is detected in response to determining that the first check failure unit count value is less than the first threshold value and that the second check failure unit count value is less than the second threshold value.

Example 8. The system of any one of Examples 1-7, wherein the one or more check failure unit count values comprise one or more CFBit count values and one or more CFByte count values, and wherein the threshold is a first threshold, the operations comprising: comparing the one or more CFBit count values to the first threshold; comparing the one or more CFByte count values to a second threshold; and determining that at least one of the one or more CFBit count values is less than the first threshold or that the one or more CFByte count values are less than the second threshold.

Example 9. The system of Example 8, the operations comprising: triggering a RAID operation to recover the data from the set of memory components in response to determining that at least one of the one or more CFBit count values is less than the first threshold or that the one or more CFByte count values are less than the second threshold.

Example 10. The system of any one of Examples 1-9, operations comprising: performing a calibration operation to compute an initial set of one or more check failure unit count values for the individual read level; and computing the one or more check failure unit count values corresponding to the individual read level after determining that the initial set of one or more check failure unit count values is less than the threshold.

Example 11. The system of any one of Examples 1-10, the operations comprising: receiving a request from a host to read a page of data, wherein the read error is detected in response to receiving the request from the host.

Example 12. The system of any one of Examples 1-11, the operations comprising: receiving a block of data from the set of memory components; computing a quantity of asserted values in a portion of the block of data; determining that the quantity of asserted values in the portion of the block of data transgresses an erased page threshold; and flagging the portion of the block of data as an empty page.

Example 13. The system of Example 12, the operations comprising performing a RAID operation to recover the data from the set of memory components in response to determining that the portion of the block of data is flagged as an empty page.

Methods and computer-readable storage medium with instructions for performing any one of the above Examples.

Figure 7:
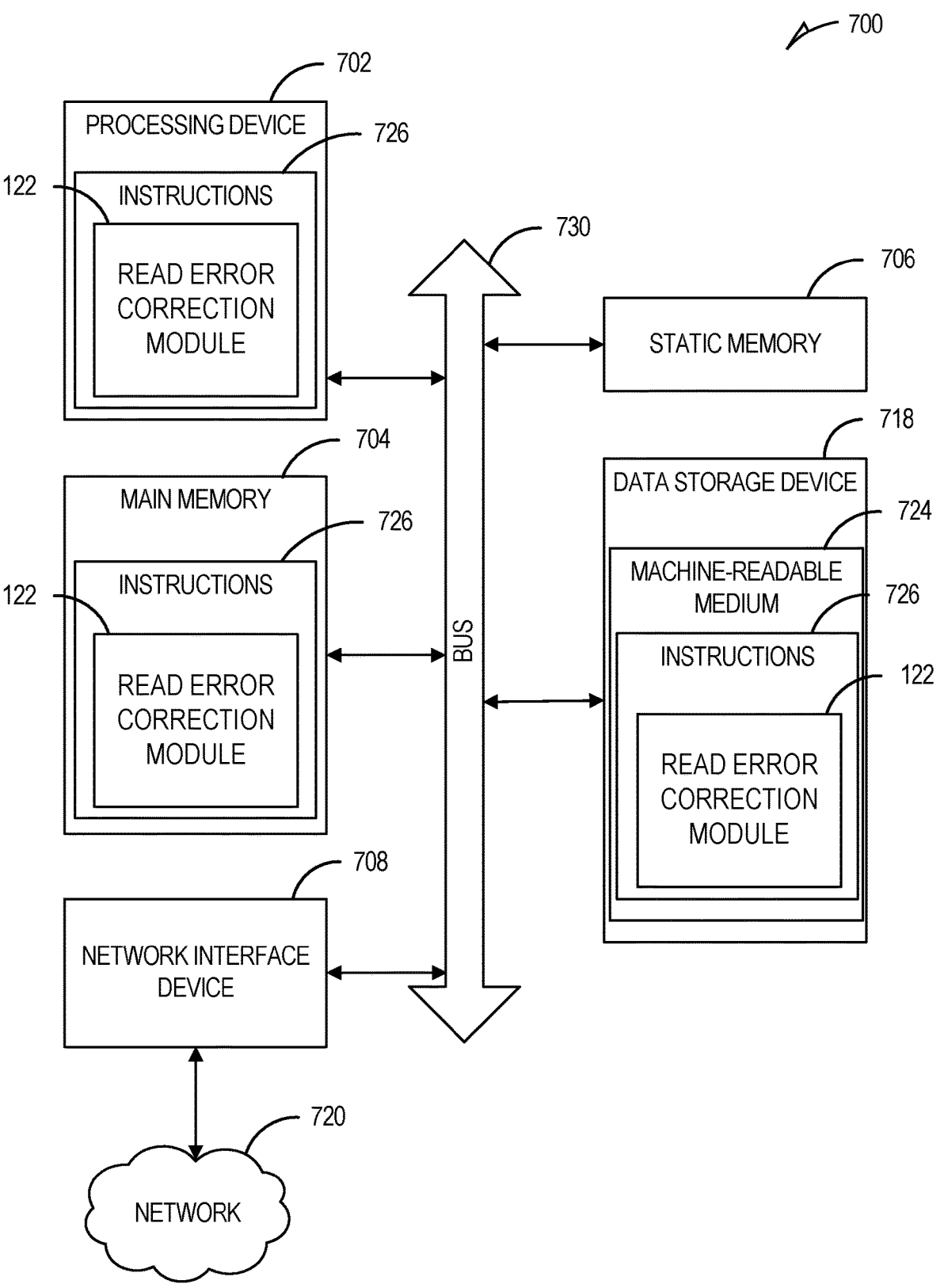
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read error correction module 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM), flash memory, DRAM such as SDRAM or RDRAM, etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an ASIC, a FPGA, a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to zone-based decoding (e.g., the read error correction module 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:

a set of memory components; and a processing device, operatively coupled to the set of memory components, programmed to perform operations comprising:

detecting a read error associated with reading data from a portion of the set of memory components in accordance with an individual read level of a plurality of read levels; and in response to detecting the read error:

applying a read threshold voltage within a range of read levels corresponding to the individual read level to the portion of the set of memory components to read the data from the portion of the set of memory components;

computing one or more check failure unit count values based on the data that has been read from the portion of the set of memory components based on the applied read threshold voltage corresponding to the individual read level;

comparing the one or more check failure unit count values to a threshold value; and determining whether the read error corresponds to an empty page read error based on a result of comparing the one or more check failure unit count values to the threshold value.

2. The system of claim 1, wherein the one or more check failure unit count values comprise one or more check failure bit (CFBit) count values.

3. The system of claim 1, wherein the one or more check failure unit count values comprise one or more check failure byte (CFByte) count values.

4. The system of claim 1, the operations comprising:

accessing a predetermined check failure unit count value associated with the individual read level of the plurality of read levels; and computing the threshold value as a function of the predetermined check failure unit count value.

5. The system of claim 1, the operations comprising:

reading the data from the set of memory components by accessing first and second read levels of the plurality of read levels;

accessing a first predetermined check failure unit count value associated with the first read level; and computing a first threshold value as a function of the first predetermined check failure unit count value.

6. The system of claim 5, the operations comprising:

accessing a second predetermined check failure unit count value associated with the second read level; and computing a second threshold value as a function of the second predetermined check failure unit count value.

7. The system of claim 6, the operations comprising:

computing a first check failure unit count value of the one or more check failure unit count values corresponding to the first read level;

computing a second check failure unit count value of the one or more check failure unit count values corresponding to the second read level; and comparing the first check failure unit count value to the first threshold value and comparing the second check failure unit count value to the second threshold value, wherein the empty page read error is detected in response to determining that the first check failure unit count value is less than the first threshold value and that the second check failure unit count value is less than the second threshold value.

8. The system of claim 1, wherein the one or more check failure unit count values comprise one or more check failure bit (CFBit) count values and one or more check failure byte (CFByte) count values; and wherein the threshold is a first threshold, the operations comprising:

comparing the one or more CFBit count values to the first threshold;

comparing the one or more CFByte count values to a second threshold; and determining that at least one of the one or more CFBit count values is less than the first threshold or that the one or more CFByte count values are less than the second threshold.

9. The system of claim 8, the operations comprising:

triggering a RAID operation to recover the data from the set of memory components in response to determining that at least one of the one or more CFBit count values is less than the first threshold or that the one or more CFByte count values are less than the second threshold.

10. The system of claim 1, the operations comprising:

performing a calibration operation to compute an initial set of one or more check failure unit count values for the individual read level; and computing the one or more check failure unit count values corresponding to the individual read level after determining that the initial set of one or more check failure unit count values is less than the threshold.

11. The system of claim 1, the operations comprising:

receiving a request from a host to read a page of data, wherein the read error is detected in response to receiving the request from the host.

12. The system of claim 1, the operations comprising:

receiving a block of data from the set of memory components;

computing a quantity of asserted values in a portion of the block of data;

determining that the quantity of asserted values in the portion of the block of data transgresses an erased page threshold; and flagging the portion of the block of data as an empty page.

13. The system of claim 12, the operations comprising performing a RAID operation to recover the data from the set of memory components in response to determining that the portion of the block of data is flagged as an empty page.

14. A method comprising:

detecting a read error associated with reading data from a portion of a set of memory components in accordance with an individual read level of a plurality of read levels; and in response to detecting the read error:

applying a read threshold voltage within a range of read levels corresponding to the individual read level to the portion of the set of memory components to read the data from the portion of the set of memory components;

computing one or more check failure unit count values based on the data that has been read from the portion of the set of memory components based on the applied read threshold voltage corresponding to the individual read level;

comparing the one or more check failure unit count values to a threshold value; and determining whether the read error corresponds to an empty page read error based on a result of comparing the one or more check failure unit count values to the threshold value.

15. The method of claim 14, wherein the one or more check failure unit count values comprise one or more check failure bit (CFBit) count values.

16. The method of claim 14, wherein the one or more check failure unit count values comprise one or more check failure byte (CFByte) count values.

17. The method of claim 14, comprising:

accessing a predetermined check failure unit count value associated with the individual read level of the plurality of read levels; and computing the threshold value as a function of the predetermined check failure unit count value.

18. The method of claim 14, comprising:

reading the data from the set of memory components by accessing first and second read levels of the plurality of read levels;

accessing a first predetermined check failure unit count value associated with the first read level; and computing a first threshold value as a function of the first predetermined check failure unit count value.

19. The method of claim 18, comprising:

accessing a second predetermined check failure unit count value associated with the second read level; and computing a second threshold value as a function of the second predetermined check failure unit count value.

20. A non-transitory computer-readable storage medium comprising instructions that, when executed by a processing device, cause the processing device to perform operations comprising:

detecting a read error associated with reading data from a portion of a set of memory components in accordance with an individual read level of a plurality of read levels; and in response to detecting the read error:

applying a read threshold voltage within a range of read levels corresponding to the individual read level to the portion of the set of memory components to read the data from the portion of the set of memory components;

computing one or more check failure unit count values based on the data that has been read from the portion of the set of memory components based on the applied read threshold voltage corresponding to the individual read level;

comparing the one or more check failure unit count values to a threshold value; and determining whether the read error corresponds to an empty page read error based on a result of comparing the one or more check failure unit count values to the threshold value.

\* \* \* \* \*